United States Patent Office 3,632,588
Patented Jan. 4, 1972

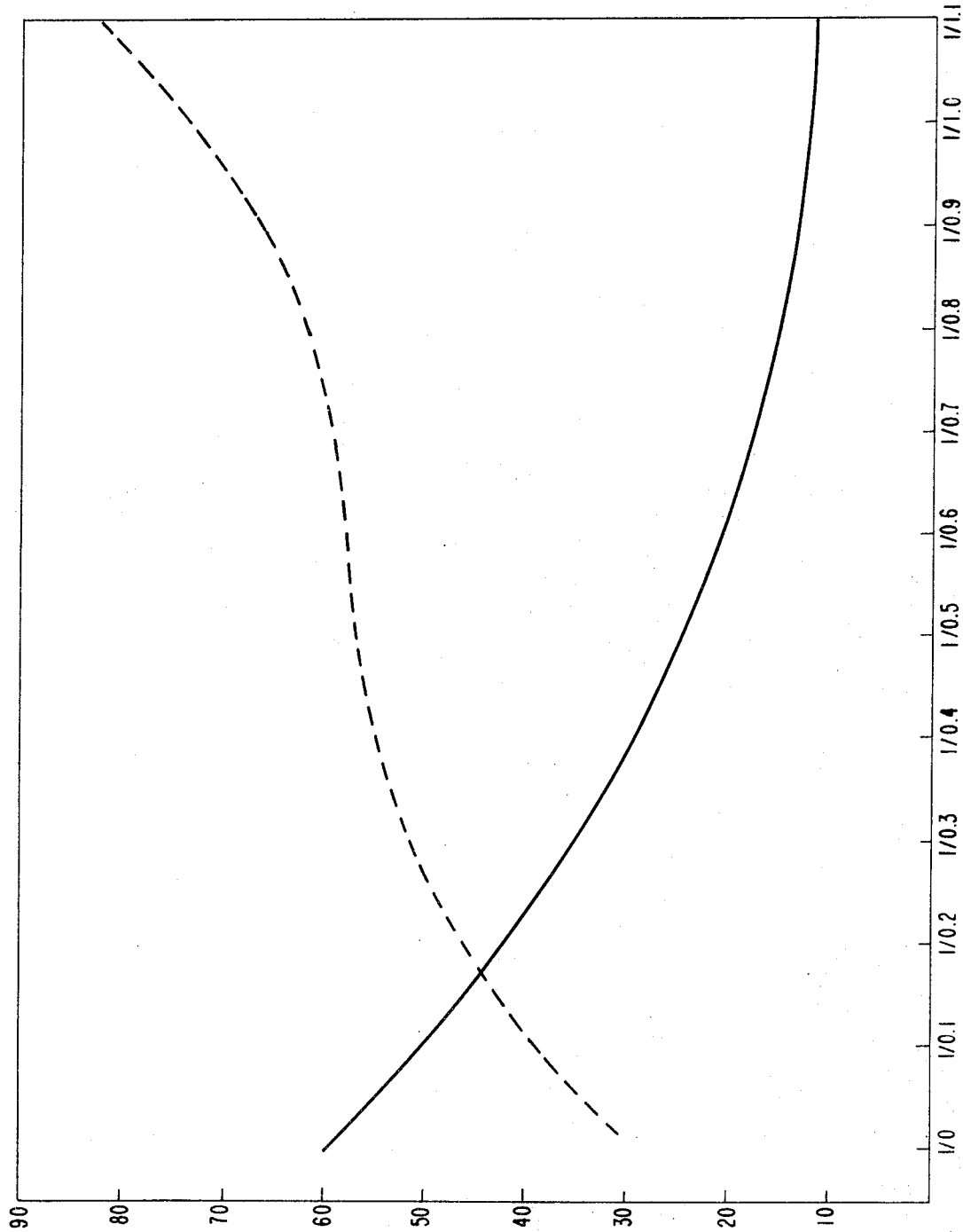

3,632,588
OXIDATION OF DIHYDROQUINACRIDONE
Felix Frederick Ehrich, Westfield, N.J., assignor to E. I. du Pont de Nemours and Company, Wilmington, Del.
Continuation-in-part of application Ser. No. 669,933, Sept. 22, 1967. This application July 20, 1970, Ser. No. 56,643
Int. Cl. C07d *37/00*
U.S. Cl. 260—279
5 Claims

ABSTRACT OF THE DISCLOSURE

Alkaline oxidation of dihydroquinacridone (DQA) by such oxidants as sodium m-nitrobenzene sulfonate (SNBS) in the presence of a compound of which sodium metanilate (SMA) is illustrative to increase the yield of quinacridonequinone (QAQ).

CROSS-REFERENCE TO RELATED APPLICATION

This application is a continuation-in-part of copending application Ser. No. 669,933, filed Sept. 22, 1967, now abandoned.

BACKGROUND OF THE INVENTION

The oxidation of DQA to linear quinacridone (QA) in alkaline medium with an oxidant such as SNBS is taught in U.S. 2,821,529; 2,844,484; 2,969,366; 3,007,930 and 3,009,916. The medium in which these reactions are commonly conducted consists of a mixture of water and a water-soluble alcohol, and it is possible by controlling the ratios and concentrations of the various components in the system to obtain the QA in the desired crystal phase. The presence of a water-soluble alcohol in the system precludes the formation of any QAQ in significant amounts.

U.S. 3,148,075 covers a method of oxidizing DQA to a mixture of QA and QAQ utilizing similar types of oxidants, the essential difference between the process of this patent and that of its predecessors being that the oxidation is conducted in a substantially aqueous medium at a pH above 13. However, a small amount of an organic liquid in the reaction medium which may facilitate the production of solid solutions is permissible (col. 3, lines 27–33, inclusive). The patent lists permissible organic liquids which are useful for this purpose (col. 3, lines 34–40, inclusive) but warns that "the amount of organic liquid should be kept very low . . ." and that "the use of larger amounts of such liquid in the reaction results in a linear quinacridone product rather than a mixture of quinacridone and quinacridonequinone" (col. 3, lines 40–46). Actually, the highest ratio of QAQ/QA attainable by the method taught in U.S. 3,148,075 is of the order of 35/65. The patent does not suggest any modification of the procedure which might lead to significantly higher proportions of QAQ.

SUMMARY OF THE INVENTION

In accordance with the present invention, a quinacridonequinone is formed by oxidizing in an alkaline medium having a pH of at least 13, a dihydroquinacridone of the formula

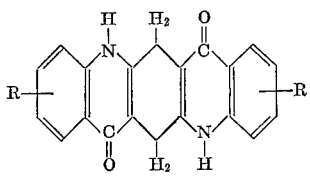

(I)

wherein R is selected from the group consisting of hydrogen, halogen, lower alkyl, and lower alkoxy, the said R groups preferably being symmetrically arranged and not exceeding a total of four; in the presence of a compound of the formula

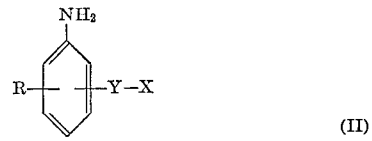

(II)

wherein R is as defined above, Y- is a member of the group consisting of

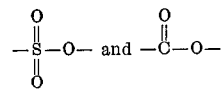

and —X is a member of the group consisting of —Na, —K, and —H.

THE DRAWING

The drawing is a plot of the weight percentages of quinacridone (solid line) and quinacridonequinone (broken line) as ordinate against the mol ratio of SNBS/SMA present during the oxidation, as abscissa.

ANALYTICAL TECHNIQUE

In the examples which follow, the ratio of QAQ to QA in the product is determined spectrophotometrically in sulfuric acid solution. For this purpose it has been found advantageous to use the absorption peak at 597 m$\mu$ for QA and that at 430 m$\mu$ for QAQ. The actual percent of QA or QAQ is calculated in terms of a known reference standard for each. A typical calculation for QA would be as follows:

Calculations

Let $k$ = Extinction coefficient of solution of reference standard quinacridone
$d$ = Optical density of solution of reference standard quinacridone
$c$ = Concentration (grams/l.) of solution of reference standard quinacridone
$l$ = path length in cm. of reference standard
$k'$ = Extinction coefficient of solution of quinacridone sample
$d'$ = Optical density of solution of quinacridone sample
$c'$ = Concentration (grams/l.) of solution of quinacridone sample
$l'$ = sample path length in cm.

(1) $$k = \frac{d}{cl}$$

(2) $$k' = \frac{d'}{c'l'}$$

(3) $$\text{Percent } QA = \frac{k'}{k} \times 100$$

The following examples, in which all parts are by weight, are cited to illustrate the invention. They are not intended to limit it in any way.

EXAMPLE 1

Twenty parts of SNBS (0.089 mole) and 17.3 parts of SMA (0.089 mole) are added to a solution of 20 parts of sodium hydroxide in 113 parts of water. The mixture is stirred at 35–40° C. for 1 hour and then 10 parts (0.0318 mole) of DQA is added and the mixture is heated gradually with stirring to reflux temperature. In this experiment, the molar ratio of SNBS to SMA is 1/1, and the molar ratio of SNBS to DQA is 2.8/1. Refluxing is continued for 4 hours, after which 500 parts of water is added and the product is isolated by filtration, and washed free of soluble base. The product is then treated with 175 parts of concentrated hydrochloric acid and the mixture is refluxed for ½ hour. The product is isolated by filtration, washed free of soluble chloride ion and dried. It has a QAQ/QA ratio of 6.47.

The absorption spectrum of the original product isolated after the oxidation shows no absorption band at 430 m$\mu$ which is typical of QAQ because the QAQ present at this point is in the form of the sodium salt of the enol isomer. However, after treatment of the product with hydrochloric acid and isolation, the absorption spectrum shows a strong band at 430 m$\mu$, indicating the presence of QAQ.

When the procedure of this example is repeated except that the SNBS is omitted, no perceptible oxidation of the DQA occurs, even after 4 hours of refluxing. However, when the regular amount of SNBS is introduced into the reaction mixture, an immediate color change takes place, indicating oxidation of the DQA. This demonstrates that SMA per se does not oxidize the DQA and that a separate oxidant is necessary.

When the procedure of this example is repeated except that a reaction medium of 60 parts of water and 80 parts of methanol is used instead of 113 parts of water, a product having a QAQ/QA ratio of 0.66 is obtained. One hundred parts of the 0.66 QAQ/QA product is milled and processed following the technique of Example 14 of U.S. 3,160,510 to form a solid solution of the components. The dry pigment so formed is suspended in 1000 parts of dimethylformamide, heated at the boil under reflux for about 20 hours, cooled, filtered, washed free of solvent, and dried to give a maroon pigment of strength, lightfastness and X-ray diffraction pattern similar to that of the product of Example 15 of U.S. 3,160,510.

EXAMPLE 2

The procedure of Example 1 was repeated except that 15.4 g. (0.089 mole) of sulfanilic acid was substituted for the SMA. A product with a QAQ/QA ratio of 3.91 was obtained.

EXAMPLES 3–10

The procedure of Example 1 is followed except that mol ratio of SNBS/SMA is varied as indicated, producing variation in the QAQ/QA ratio, as shown in the drawing and as reported in the table.

TABLE

| Example No. | SNBS/SMA (mole ratio) | QAQ/QA (weight ratio) |
|---|---|---|
| 3 | 1/0 | 0.48 |
| 4 | 1/0.1 | 0.84 |
| 5 | 1/0.2 | 1.27 |
| 6 | 1/0.3 | 1.56 |
| 7 | 1/0.4 | 1.89 |
| 8 | 1/0.6 | 2.46 |
| 9 | 1/0.8 | 2.85 |
| 10 | 1/1.1 | 6.79 |

Total yields in the foregoing examples range from 81–94% of theory with the highest yields being obtained in those cases where the larger amount of SMA is used.

One hundred parts of the product from Example 8 is ball milled with 900 parts of crystalline sodium chloride and subsequently processed as outlined in detail in Example 14 in U.S. 3,160,510. The resulting product has an X-ray diffraction pattern corresponding to that found in the product of Example 14 of U.S. 3,160,510. The similarity of this diffraction pattern to that of pure QAQ and the absence therefrom of any characteristic lines of linear quinacroidone per se indicated that the final product is a solid solution of QA in QAQ. This reddish-yellow pigment is of interest because of its good intensity and lightfastness.

EXAMPLE 11

This example illustrates the use of p-nitrobenzoic acid in place of SNBS, and p-aminobenzoic acid in place of SMA in the operation of this invention. For this experiment, 18.6 parts (0.135 mole) of p-aminobenzoic acid and 7.5 parts (0.045 mole) of p-nitrobenzoic acid are added to 10 parts NaOH and 65 parts H$_2$O in a 500 ml. flask. To this was added five parts (0.0159 mole) DQA. In this mixture, the mole ratio of p-nitrobenzoic acid to p-aminobenzoic acid is 1/3, and the molar ratio of p-nitrobenzoic acid to DQA is 2.8/1. The mixture was heated to reflux and maintained at reflux for 4 hours. At the conclusion of the four-hour heating time, 200 ml. water was added and the product isolated by filtration, washed with water, and transferred to the 500 ml. flask. To the flask was added 100 ml. of HCl (concentrated) and the mixture refluxed for ½ hour. The product was again isolated by filtration, was thoroughly washed with water, and oven dried. Infrared analysis showed the product to be QAQ and QA in ratio of 2.5/1.

EXAMPLE 12

The process described in Example 10 was repeated using the same amounts of reactants, but with the following variation in the procedure: The p-aminobenzoic acid, p-nitrobenzoic acid, sodium hydroxide, and water were heated under reflux for 2 hours prior to the introduction of DQA into the flask. The product which was obtained was found to be QAQ and QA in a ratio of 2.86/1.

MODIFICATIONS AND EQUIVALENTS

While the process of the present invention has been exemplified with SNBS and with p-nitrobenzoic acid as oxidizing agents, other oxidizing agents may be used such as nitrobenzene, p-nitrotoluene, m-nitrophenol, m-nitrobenzoic acid, 4-nitrophthalic acid, and 2-methyl-5-nitrosodium-benzenesulfonate.

The dihydroquinacridones that may be oxidized by this procedure as defined in Formula I include unsubstituted dihydroquinacridone, as well as both symmetrically and unsymmetrically substituted dihydroquinacridones. Examples of such substituted dihydroquinacridones are:

2,9-dimethyl-6,13-dihydroquinacridone
2,9-difluoro-6,13-dihydroquinacridone
2,9-dichloro-6,13-dihydroquinacridone
4,11-dichloro-6,13-dihydroquinacridone
4,11-dimethyl-6,13-dihydroquinacridone
2,9-dimethoxy-6,13-dihydroquinacridone
4-chloro-6,13-dihydroquinacridone.

The substituted dihydroquinacridones produce both a substituted quinacridone and a substituted quinacridonequinone, wherein the substituents are in the same relative positions respectively as they are in the starting material.

The amount of oxidizing agent used may vary over a wide range. As little as 1 mole of the oxidizing agent per mole of dihydroquinacridone will convert the dihydro compound to a mixture of quinacridone and quinacridonequinone. The upper range is determined solely by economic considerations. It is preferred to use from about 1 to about 3 moles of oxidizing agent per mole of dihydroquinacridone. Since most dihydroquinacridone compounds show characteristic fluoroscence under ultraviolet light, this property may be used to advantage to determine the reaction time. The reaction is usually conducted until no fluoroescence is detectable. Reaction times of 3 to 6 hours are usually sufficient, but the time required will depend to some extent upon the temperature and the nature of the particular dihydro-derivative to be oxidized. In general, longer reaction times have no adverse effect on the reaction.

The examples have shown that the product may be obtained under conditions which will lead to a physical mixture of a linear quinacridone and a quinacridonequinone or to a solid solution of these two components where one compound enters into the crystal lattice of the other. It is also possible to obtain a composition comprising a physical admixture of a solid solution with either a quinacridone or a quinacridonequinone, or with both of these. In addition to sodium metanilate, sodium sulfanilate, and sodium p-aminobenzoate, derivatives of aniline as defined in Formula II above may be used to direct the oxidation reaction and promote the formation of higher proportions of quinacridonequinone relative to quinacridone formed in the oxidation of a dihydroquinacridone. Substituents which promote the solubilization in an aqueous alkaline solution are particularly desirable. Typical suitable agents include potassium metanilate, sodium 3 - amino - 5 - chloro - benzenesulfonate, sodium 3 - amino - 5 - methyl - benzenesulfonate, sodium 3-amino - 5 - ethoxy - benzenesulfonate, potassium sulfanilate, sodium orthanilate, sodium anthranilate, sodium m-aminobenzoate. These agents may be used in an amount from 0.1 to 3.0 moles per mole of oxidizing agent. They should be present in the original mixture before any significant oxidation occurs. However, they may be formed in situ, e.g., by using sulfanilic acid in the alkaline medium to form sodium sulfanilate in situ.

The products of the process of the present invention are useful as pigments.

What is claimed is:

1. In a process for the oxidation of dihydroquinacridone to obtain quinacridone and quinacridonequinone by reacting, in an aqueous alkaline medium having a pH of at least 13, (1) a dihydroquinacridone of the formula

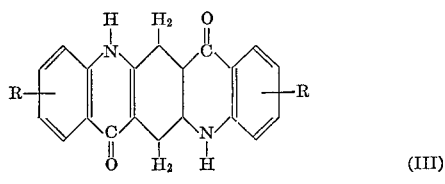

(III)

where R is selected from the group consisting of hydrogen, halogen, lower alkyl and lower alkoxy; and (2) 1–3 moles per mole of said dihydroquinacridone, of an oxidizing agent selected from the group consisting of nitrobenzene, sodium-m-nitrobenzene sulfonate, p-nitrotoluene, m-nitrophenol, p-nitrobenzoic acid, m-nitrobenzoic acid, 4-nitrophthalic acid and 2-methyl-5-nitrosodium-benzenesulfonate, the improvement which comprises including in the original reaction mixture a compound of the formula

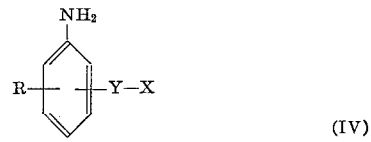

(IV)

wherein R is selected from the group consisting of hydrogen, halogen, lower alkyl and lower alkoxy; Y is a member of the group consisting of

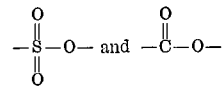

and X is a member of the group consisting of —Na, —K, and —H in an amount of from 0.1 to 3.0 moles of said (IV) compound per mole of oxidizing agent; and recovering the resulting reaction products.

2. The process of claim 1 wherein in the said (III) compound R is hydrogen, and the said (IV) compound is sodium metanilate.

3. The process of claim 2 wherein the said oxidizing agent is sodium-m-nitrobenzene sulfonate.

4. The process of claim 1 wherein in the said (III) compound R is hydrogen, and the said (IV) compound is sodium sulfanilate.

5. The process of claim 1 wherein in the said (III) compound, R is hydrogen, the said oxidizing agent is p-nitrobenzoic acid and the said (IV) compound is p-aminobenzoic acid.

References Cited

UNITED STATES PATENTS

| 2,969,366 | 1/1961 | Griswold et al. | 260—279 |
| 3,007,930 | 11/1961 | Manger et al. | 260—279 |
| 3,024,239 | 3/1962 | Caliezi | 260—279 |
| 3,148,075 | 9/1964 | Ehrich | 260—279 X |
| 3,251,845 | 5/1066 | Jaffe | 260—279 |
| 3,475,436 | 10/1969 | Cooper | 260—279 |

FOREIGN PATENTS

| 1,328,160 | 4/1963 | France | 260—279 |

DONALD G. DAUS, Primary Examiner

U.S. Cl. X.R.

106—288 O; 260—505 R, 508, 515 R, 515 P, 518 R, 619 R